United States Patent [19]

McGarvey

[11] 4,082,521
[45] Apr. 4, 1978

[54] ENDLESS ABRASIVE BELT, AND LAMINATED PATCH SPLICE THEREFOR

[75] Inventor: Jarvis M. McGarvey, Grand Island, N.Y.

[73] Assignee: The Carborundum Company, Niagara Falls, N.Y.

[21] Appl. No.: 714,071

[22] Filed: Aug. 13, 1976

Related U.S. Application Data

[63] Continuation of Ser. No. 413,466, Nov. 7, 1973, abandoned.

[51] Int. Cl.² .............................................. B24B 1/00
[52] U.S. Cl. ........................................ 51/295; 51/297; 428/36; 428/57; 428/61; 428/246; 428/252; 428/257
[58] Field of Search ................... 51/295, 297; 428/36, 428/57, 61, 246, 252, 257

[56] References Cited

U.S. PATENT DOCUMENTS 2,391,731  12/1945  Miller et al. ......................... 51/399
3,665,660  5/1972   Malloy et al. ........................ 51/399
3,763,604  10/1973  Malloy ................................. 51/399

FOREIGN PATENT DOCUMENTS 1,201,301  8/1970  United Kingdom.
1,259,757  1/1972  United Kingdom.

Primary Examiner—James J. Bell
Attorney, Agent, or Firm—David E. Dougherty; Robert C. Weber

[57] ABSTRACT

Endless coated abrasive belts require a splice between two ends of coated abrasive sheet material. According to this invention, this splice comprises (1) a straight slit woven fabric layer, preferably a wholly aromatic polyamide, (2) a plastic film layer, preferably polyimide film, (3) first means joining the fabric layer and plastic film layer into an integral laminated patch, preferably by polyurethane adhesive, and (4) second means joining the integral laminated patch to the backing sheet of the coated abrasive sheet material, which is also preferably polyurethane adhesive.

20 Claims, 9 Drawing Figures

ENDLESS ABRASIVE BELT, AND LAMINATED PATCH SPLICE THEREFOR

This is a continuation, of copending application Ser. No. 413,466, filed Nov. 7, 1973, now abandoned.

BACKGROUND OF THE INVENTION

Coated abrasive endless abrasive belts have been joined together by a variety of splices. One type of splice which has proved highly effective is the lap splice which requires that one end of the abrasive sheet material be overlapped on the other end of the abrasive sheet material, and usually adhesively joined to the other end. In order to avoid a disruptive lump in the coated abrasive belt, some special steps must be taken in order to reduce the thickness of the coated abrasive belt at this junction. Usually the method employed has been to grind away a portion of the coated abrasive belt on one end, producing a feather edge which can be adhesively joined to the other end. This joint is relatively complicated to produce.

Another form of splice is the patch splice, wherein two ends of coated abrasive sheet material are abuttingly juxtaposed, and covered with a patch which is adhesively joined to the back (nonabrasive) side of the backing sheet. Fabric splices for this purpose have been proposed in the past, however, they pose certain problems. For example, it is found that when the splice is made directly perpendicular to the running direction of the belt, particularly with a patch splice, the disruptive effect of a thicker portion of the belt in the location where the ends are joined together is objectionable to operators of machinery utilizing coated abrasive belts. Accordingly, coated abrasive belts are usually manufactured with the joint set at an angle other than perpendicular (usually between 30° and 70°) the running direction of the belt, so that the entire splice will not pass over the material being ground with the abrasive belt at the same time. For wider belts (for example, those over 14 inches in width), this angle can be nearly perpendicular to the running direction of the belt, conventionally 70° from the running direction of the belt. Narrower belts are joined at sharper angles. In either case, but particularly in the case where the angle of the splice is relatively sharp with respect to the running direction of the belt, the use of fabric splices presents a dilemma. On the one hand, it is much more convenient to use "straight slit" fabrics, i.e., to cut the fabric patch material in directions which are parallel to the running direction of the yarns which make up the fabric. If this is done, however, the fill yarns of the patch material which is used for the splice are stretched parallel to the running direction of the belt, during operation of the belt. This results in distortion of the joint (called "yawing" of the joint) which is found objectionable, if not totally unallowable, by users of coated abrasive belts.

In order to prevent this yawing problem, it has been proposed to use "bias slit" fabrics for patch splices for coated abrasive belts. In the bias slit patch, the fabric which is to be used as the patch material is cut along the bias of the fabric, at the same angle as the splice is to bear to the running direction of the belt. Thus, some of the yarns in the patch are parallel to the running direction of the belt, and others are perpendicular to the running direction of the belt. This bias slitting operation consumes time, as well as wasting a portion of the material which is to be used for the coated abrasive splice. Furthermore, because the material is cut on the bias, only limited lengths of fabric can be produced, since the fabric is cut from a roll of material of limited width, and being cut at an angle, the edge of the fabric is soon reached. Since it is undesirable to produce a patch for a coated abrasive belt which itself contains a splice between two portions of splice material, this results in additional loss of fabric and requires additional time in the fabrication of the splice, due to the fact that the splice operator must rethread his machine with a new piece of bias slit fabric, every few splices.

It is, therefore, a object of the present invention to produce an improved splice for abrasive belts, and an improved endless belt containing such a splice.

SUMMARY OF THE INVENTION

In accordance with this invention, there is provided a splice for joining two abuttingly juxtaposed ends of coated abrasive sheet material into endless coated abrasive belts (and more generally, for joining various other types of sheet material into endless belts) at an angle other than perpendicular to the running direction of the belt, which comprises (1) a straight slit woven fabric layer, (2) a yaw preventing and heat resistant plastic film layer having multi-directional strength, (3) first means joining the woven fabric layer and the plastic film layer into an integral laminated patch, and (4) second means for joining the integral laminated patch to the back (nonabrasive) side of the coated abrasive sheet material so that the patch overlaps such ends and extends along such joint substantially at said angle. The invention further provides a method for producing such a splice.

The present invention also provides an endless belt of flexible abrasive-coated sheet material, comprising (1) a flexible backing sheet having first and second surfaces, and abrasive grains firmly affixed to the first surface of the backing sheet by a binder adhesive, the backing sheet having two complementary abuttingly juxtaposed ends forming a joint at an angle from about 30° to about 70° to the running direction of the belt; and (2) an integral laminated patch splice firmly affixed to the second surface of the backing sheet (i.e., the non-abrasive side of the coated abrasive sheet material) and uniting such joint by, joining the two complementary abuttingly juxtaposed ends together to form an endless belt, said patch splice being the that described above. The invention further provides a method for making such an endless belt of flexible abrasive-coated sheet material.

DETAILED DESCRIPTION

The first step of the process for making an endless belt according to the invention is the preparation of a backing sheet having abrasive grains firmly affixed to one surface by a binder adhesive. For purposes of reference, the surface to which the abrasive grains are firmly affixed is called the "first surface", and the other side of the backing sheet is called the "second surface". The backing material may consist of any conventional backing used in abrasive coated products, for example, paper; cloth, in various forms such as drills, jeans, heavy twill and other cloth backings; vulcanized fiber; and leather. The backing may be pretreated in any manner conventional in the art, such as for example having a coating or filling in order to waterproof the backing.

The backing has firmly affixed to it, on the first surface, abrasive grains. These abrasive grains can be affixed adhesively as is well known in the art. The abrasive grains may comprise such abrasive materials as alumina, aluminazirconia fused mixtures, silicon carbide, diamond, garnet, quartz, vermiculite, or flint. The abrasive grains may be of any grit size useful for coated abrasive belts. The adhesive securing the abrasive grains on the backing material may be glue, resin, or varnish, the choice of which depends on the desired flexibility and stretch, resistance to heat and other factors which are determined by the intended use of the finished article and production requirements.

After the backing sheet is coated with abrasive granules as described above, it is cut to the shape of a parallelogram, having a base length equal to the desired belt circumference and a height equal to the desired width of the belt.

Figure 1:
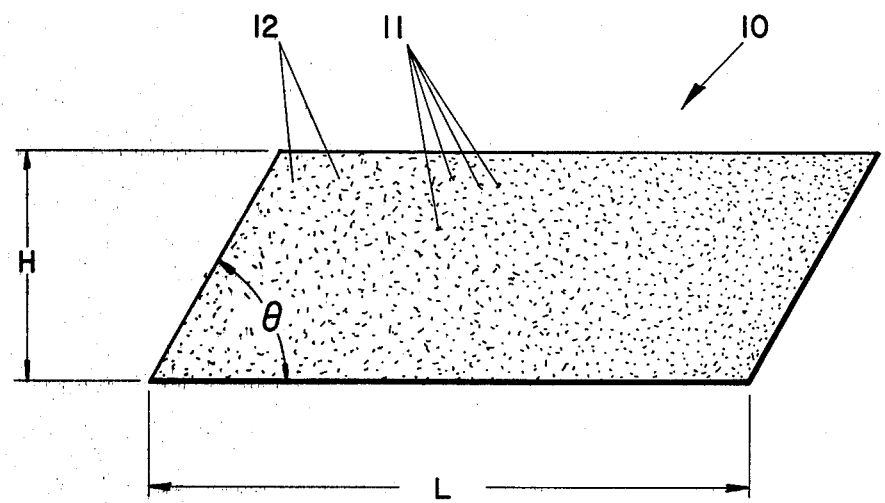
FIG. 1 is a plan view of a backing sheet of coated abrasive sheet material, cut to the shape of a parrallelogram for use in an endless belt according to the present invention.

Referring now to FIG. 1, there is illustrated a backing sheet 10 having first and second surfaces, FIG. 1 being a plan view of the coated abrasive backing sheet with the first surface upwards. Abrasive grain 11 is firmly affixed to the first surface 12 of the backing sheet 10 by a binder adhesive. The backing sheet has been cut to the shape of a parallelogram having a base length L equal to the desired belt circumference and a height H equal to the desired width of the belt.

Figure 2:
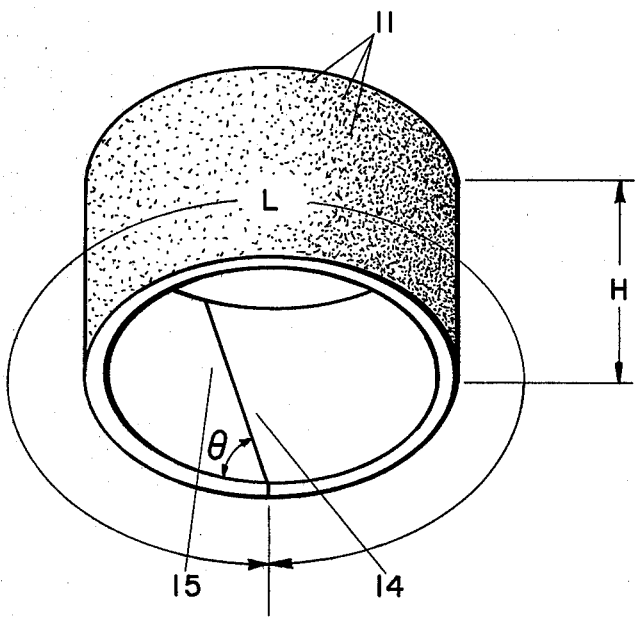
FIG. 2 is a perspective view of the parallelogram-shaped coated abrasive sheet material illustrated in FIG. 1, in which the ends of the backing sheet to be joined are abuttingly juxtaposed, such that the ends of the parallelogram are aligned and have the second surface of the backing sheet on the same side of the backing sheet, preparatory to applying the laminated patch splice of the present invention.

Referring now to FIG. 2, there is illustrated the orientation of the backing sheet 10 prior to joining the ends with the integral laminated patch according to the present invention. It will be noted that the ends 14, 15 of the backing sheet which are to be joined are abuttingly juxtaposed such that the ends 14, 15 of the parallelogram are aligned and have the second surface of both ends on the same side (upwards, as shown) of the backing sheet. Depending on the angle $\theta$ which is desired for the ultimate coated abrasive joint, the backing sheet is cut at an angle to the longitudinal axis (see FIG. 1). Very narrow strips may be cut at a small angle (30° is not uncommon) and very wide strips may be cut at larger angles (as high as 70° is not uncommon) if desired. Generally speaking, backing sheet ends cut at angles approaching 90° to the longitudinal axis of the parallelogram are undesirable because abrasive belts from these strips perform in an unsatisfactory manner on most belt sanders and grinders.

Figure 3:
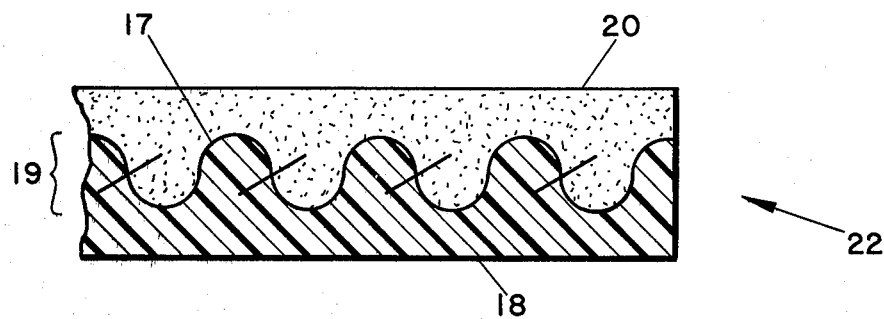
FIG. 3 is a cross-sectional representation of one embodiment of the patch splice of the present invention, wherein a plastic film layer and a woven fabric layer have been joined together into an integral laminated patch by fusing the plastic film layer to the woven fabric layer.

Referring to FIG. 3, there is illustrated a first embodiment of a patch splice for endless belts in accordance with the present invention. In this embodiment, the woven fabric layer 17 and plastic film layer 18 are joined to form an integral laminated patch, by pressing the woven fabric layer 17 and the plastic film layer 18 together at a temperature sufficient to melt the plastic film layer, whereby to fuse the plastic film layer to the woven fabric layer. As illustrated in FIG. 3, the plastic film layer and woven fabric layer essentially occupy in part the same location, since the plastic film is melted and flows between the fibers of the woven fabric layer. This is shown schematically in FIG. 3 by overlapped portion 19.

In addition to woven fabric layer 17 and plastic film layer 18, joined together to form an integral laminated patch, there is provided an adhesive layer 20 on one side of the integral patch, preferably on the woven fabric surface of the integral patch as shown in FIG. 3.

Figure 4:
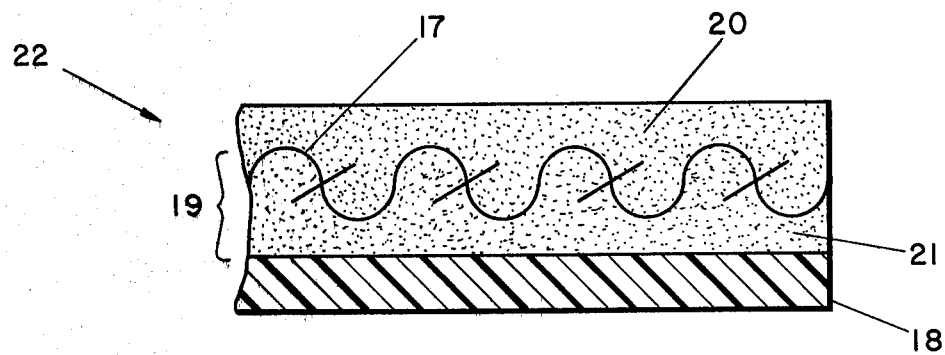
FIG. 4 is an illustration of another embodiment of the patch splice of the present invention, wherein the woven fabric layer and plastic film layer have been joined into an integral laminated patch by adhesive.

Another embodiment of the patch of the present invention is shown in FIG. 4. In this embodiment, woven fabric layer 17 and plastic film layer 18 are joined with an adhesive 21, which again penetrates into woven fabric layer 17, as shown in overlapped portion 19.

Figure 5:
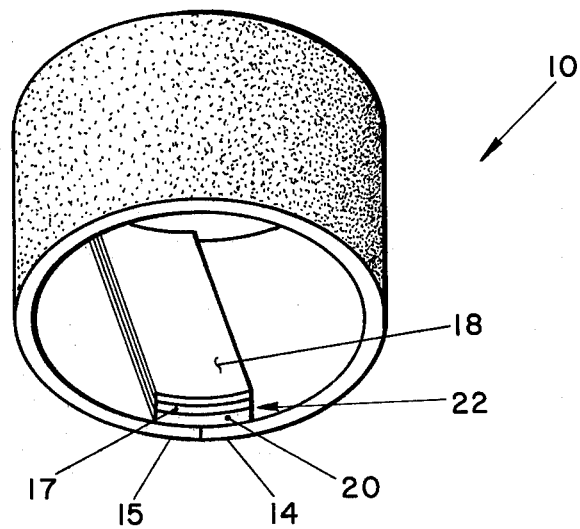
FIG. 5 is an illustration of the completed coated abrasive endless belt, in which the ends as juxtaposed in FIG. 2 have been joined with a laminated patch splice in accordance with the present invention.
Figure 6:
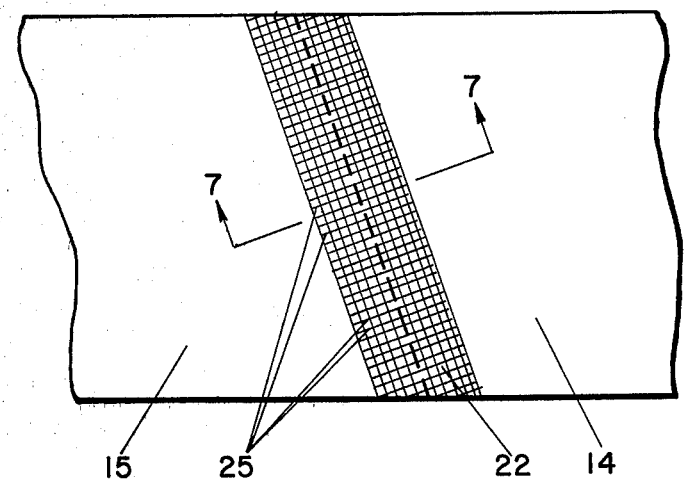
FIG. 6 is an enlarged plan view of a portion of the completed belt illustrated in FIG. 5, showing the splice in greater detail.

After the woven fabric and plastic film layers are joined and coated to form an adhesive-coated integral patch splice 22, as illustrated in FIGS. 3 or 4, and the ends of the backing sheet which are to be joined have been abuttingly juxtaposed such that the ends of the parallelogram are aligned and have the second surface on the same side of the backing sheet, as illustrated in FIG. 2, the adhesive-coated integral patch splice 22 is joined to the aligned abuttingly juxtaposed ends of the backing sheet, overlapping each end 14 and 15 of the backing sheet 10 and extending along the joint substantially at angle $\theta$, as illustrated in FIG. 2, 5 and 6, whereby to unite the abuttingly juxtaposed ends 13 and 14 of the backing sheet 10 and produce an endless belt of flexible abrasive coated sheet material.

FIG. 6 is an enlarged plan view of a portion of the perspective view shown in FIG. 5, illustrating the patch splice in greater detail. In FIG. 6, the fiber orientation of the woven fabric layer of patch splice 22 is shown. It is to be noted that the woven fabric is "straight slit", i.e., cut in directions parallel to the running direction of the yarns which make up the fabric, a practice which in the past has led to an unsatisfactory joint because the stresses placed on the joint during use tended to pull the fill threads 25 parallel to the running direction of the endless abrasive belt, resulting in distortion of the belt at the joint. This distortion was also a point of weakness, and could lead to failure of the belt at this point. In accordance with the present invention, however, no such distortion is observed to occur, due to the presence of the plastic film layer 18 (not shown in FIG. 6).

Figure 7:
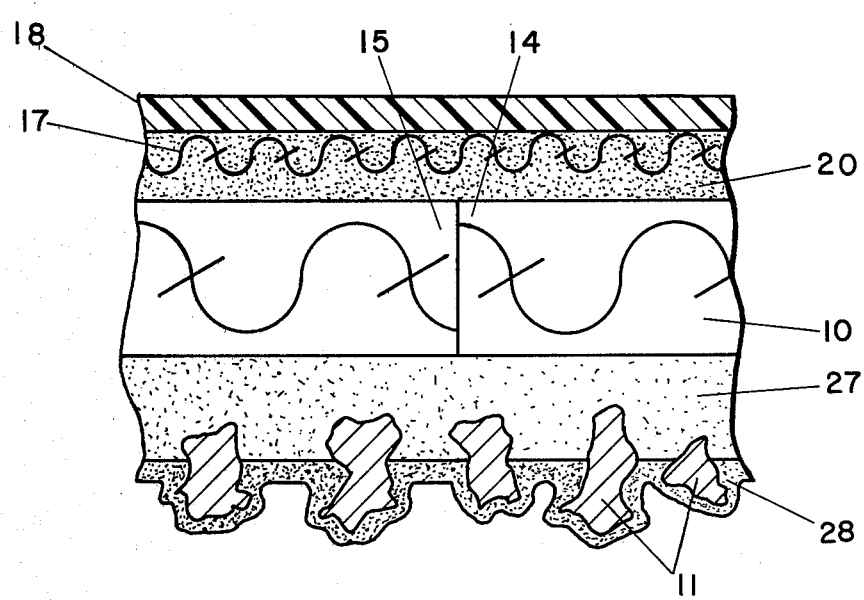
FIG. 7 is a further expanded sectional view of the splice illustrated in FIG. 6, showing yet further detail.

FIG. 7 is a further expansion of the joint illustrated in FIG. 6, FIG. 7 being a sectional view taken along line 7—7 as illustrated in FIG. 6. As illustrated in FIG. 7, the flexible backing sheet has abrasive grains 11 firmly affixed to the first surface of the backing sheet by means of making adhesive coat 27 and size adhesive coat 28, such as is customary in the art.

The invention will now be illustrated with an example.

EXAMPLE

Figure 8:
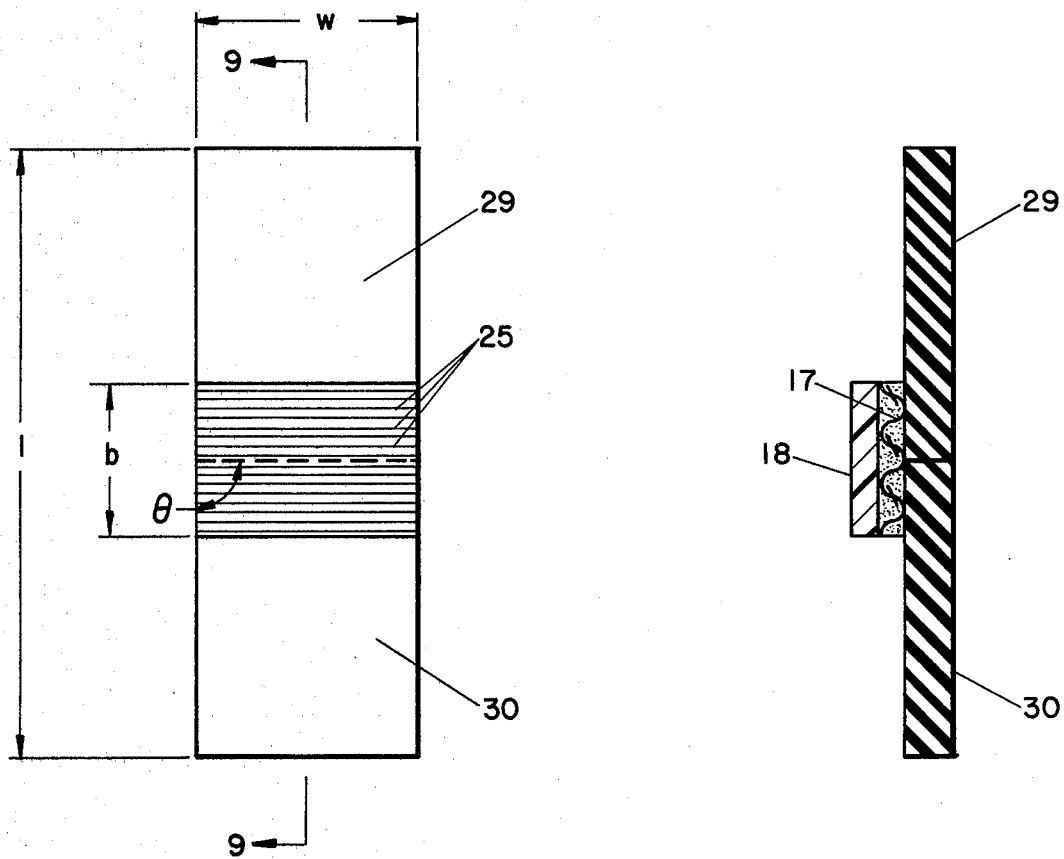
FIGS. 8 and 9 illustrate a test piece of material which was made in accordance with the present invention, in order to test the strength of the splice made in accordance with the present invention.
Figure 9:
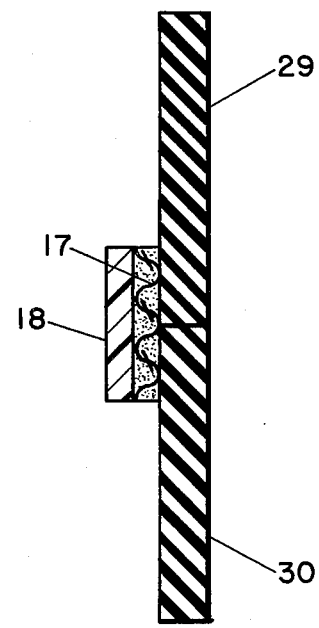

Referring now to FIGS. 8 and 9, a testing strip was made to test the strength of a joint made in accordance with the present invention. Referring to FIG. 8, two rectangles 29 and 30 of vulcanized fiber, about 760 microns thick, were joined with a patch splice in accordance with the present invention. The sample was 0.5 inch wide (illustrated as "w" in FIG. 8) and 2.0 inches long (illustrated as "l" in FIG. 8). Woven fabric layer 17 was a 165 micron thick piece of Nomex ® aromatic polyamide, having a square weave. Plastic film layer 18 was a 75 micron Kapton ® polyimide film. Layers 17 and 18 were joined to each other and to rectangles 29 and 30 with a conventional polyurethane adhesive. Two samples were tested for tensile strength (stress applied at time of break) and elongation (change in length observed while experiencing a 50 pound stress) in a standad Instron tensile strength tester. Two samples were constructed similar to the sample illustrated in FIGS. 8 and 9, one sample with the warp yarns 25 parallel to the splice direction, as shown in FIG. 8, and a second sample with the warp yarns perpendicular to the splice direction. In both cases, however, the splice angle θ was 90°. For comparison with the elongation test, a blank composed of a similar 760 micron thick vulcanized fiber rectangle, 0.5 inch by 2.0 inches, was tested for elongation. Five samples of each configuration were tested, with the elongation at 50 pounds stress and the stress at splice failure being recorded. The results are set forth in table 1.

TABLE 1

| Warp Direction | 50 Pounds Stress | Tensile Strength (Pounds per 0.5" Length) |
|---|---|---|
| Parallel to Splice (θ = 90°) | 0.025" to 0.030" | 104, 103, 99, 101, 98 |
| Perpendicular to Splice (θ = 90°) | 0.022" to 0.025" | 115, 115, 114, 115, 113 |
| Blank | 0.015" (1 test only) | |

The test reported in Table 1 was at room temperature, but the temperature was not closely controlled. Furthermore, the test at room temperature was considered to be somewhat unrepresentative of operating conditions for coated abrasive belts, which frequently operate at temperatures in the order of 60 to 100° C. Furthermore, it was desired to obtain a test which more nearly approximated the angles which are usually used in manufacturing coated abrasive belts. Accordingly, the test reported in table 1 was repeated with 26 additional samples. The angle θ (see FIG. 8) was varied at 90°, 70° and 55°. The temperature was varied at 21.1° C (70° F), 65.6° C (190° F) and 93.3° C (200° F). 3 samples were tested under each of these 9 conditions, except the 55° angle, 65.6° C test at which only 2 samples were tested. Elongation measurements were taken at 25 pounds total stress over the 0.5 inch splice, and again at 50 pounds total stress over the 0.5 inch splice. Tensile stress in pounds in failure, for the total splice, were recorded. The width "w" as indicated in FIG. 8 remained constant, so that the tests in which angle θ was 70° had a splice about 2.12 inches long, and the splice in which angle θ was 55° had a splice about 2.44 inches long.

The results of these tests are set out in Table 2.

TABLE 2

| Splice Direction and Temperature | | Elongation (inches) at: | | Tensile Stress (Pounds) Over Entire Sample |
|---|---|---|---|---|
| | | 25 Pounds Stress | 50 Pounds Stress | |
| θ = 90° T = 21.1° C | (1) | 0.010 | 0.020 | 94 |
| | (2) | 0.010 | 0.020 | 100 |
| | (3) | 0.010 | 0.020 | 102 |
| θ = 90° T = 65.6° C | (1) | 0.015 | 0.035 | 77 |
| | (2) | 0.015 | 0.040 | 77 |
| | (3) | 0.015 | 0.025 | 78 |
| θ = 90° T = 93.3° C | (1) | 0.020 | 0.055 | 55 |
| | (2) | 0.020 | 0.050 | 58 |
| | (3) | 0.020 | 0.060 | 57 |
| θ = 70° T = 21.1° C | (1) | 0.010 | 0.025 | 95 |
| | (2) | 0.010 | 0.020 | 96 |
| | (3) | 0.010 | 0.025 | 95 |
| θ = 70° T = 65.6° C | (1) | 0.015 | 0.040 | 75 |
| | (2) | 0.015 | 0.040 | 75 |
| | (3) | 0.015 | 0.035 | 75 |
| θ = 70° T = 93.3° C | (1) | 0.020 | 0.060 | 55 |
| | (2) | 0.020 | 0.060 | 55 |
| | (3) | 0.020 | 0.060 | 55 |
| θ = 55° T = 21.1° C | (1) | 0.010 | 0.025 | 87 |
| | (2) | 0.050 | 0.020 | 90 |
| | (3) | 0.010 | 0.020 | 90 |
| θ = 55° T = 65.6° C | (1) | 0.020 | 0.050 | 66 |
| | (2) | 0.015 | 0.040 | 69 |
| θ = 55° T = 93.3° C | (1) | 0.020 | 0.065 | 53 |
| | (2) | 0.025 | 0.085 | 50 |
| | (3) | 0.025 | 0.075 | 51 |

For comparative purposes, similar tests were run using the same adhesive, but using only a 230 micron thick wholly aromatic polyamide (Nomex ® nylon) square weave fabric as the patch material. In one series of comparative tests, the material was "straight slit" (cut parallel to the running directions of the yarns which make up the fabric) and joined to the two ends at a 90° angle. In another comparative test, the same straight slit material was joined to the two end members at a 70° angle. In a third comparative test, 230 micron material was cut at a 55° bias angle, and joined to two test end pieces at a 55° angle, so that the warp yarns were perpendicular to the direction of stress for the test. The results are set out in table 3, wherein a line (—) indicates failure before reaching 50 pounds stress.

TABLE 3

| Splice Direction and Temperature | | Elongation (inches) at: | | Tensile Stress (Pounds) Over Entire Sample |
|---|---|---|---|---|
| | | 25 Pounds Stress | 50 Pounds Stress | |
| Q = 90° T = 21.1° C | (1) | 0.015 | 0.035 | 98 |
| | (2) | 0.015 | 0.035 | 97 |
| | (3) | 0.015 | 0.025 | 95 |
| θ = 90° T = 65.6° C | (1) | 0.025 | 0.055 | 75 |
| | (2) | 0.020 | 0.055 | 68 |
| | (3) | 0.020 | 0.044 | 73 |
| θ = 90° T = 93.3° C | (1) | 0.025 | 0.060 | 53 |
| | (2) | 0.035 | — | 48 |
| | (3) | 0.025 | 0.055 | 55 |
| θ = 70° T = 21.1° C | (1) | 0.015 | 0.030 | 75 |
| | (2) | 0.010 | 0.025 | 78 |
| | (3) | 0.015 | 0.035 | 66 |
| θ = 70° T = 65.6° C | (1) | 0.020 | — | 48 |
| | (2) | 0.020 | 0.050 | 56 |
| | (3) | 0.020 | — | 49 |
| θ = 70° T = 93.3° C | (1) | 0.035 | — | 33 |
| | (2) | 0.030 | — | 35 |
| | (3) | 0.035 | — | 33 |
| θ = 55° T = 21.1° C | (1) | 0.015 | 0.040 | 68 |
| | (2) | 0.015 | 0.035 | 69 |
| | (3) | 0.015 | 0.030 | 73 |
| θ = 55° | (1) | 0.020 | 0.045 | 57 |

TABLE 3-continued

| Splice Direction and Temperature | | Elongation (inches) at: | | Tensile Stress (Pounds) Over Entire Sample |
|---|---|---|---|---|
| | | 25 Pounds Stress | 50 Pounds Stress | |
| T = 65.6° C | (2) | 0.020 | 0.050 | 57 |
| | (3) | 0.015 | 0.045 | 56 |
| θ = 55° | (1) | 0.025 | — | 40 |
| T = 93.3° C | (2) | 0.025 | — | 41 |
| | (3) | 0.035 | — | 33 |

It can be seen by comparing the above data that the patch of the present invention, for which the data is set out on table 2, is only slightly thicker than the patch containing only adhesive and aromatic polyamide, it is substantially stronger, particularly in those cases where the angle of splice is not perpendicular. Thus, a comarison of the 55° angle splices in tables 2 and 3 shows the splice of the invention to be between 19 and 35% stronger than the comparative splice, depending on temperature; and a comparison of the 70° angle splices in table 2 and 3 shows the splice of the invention to be from 30 to 63% stronger than the comparative splice of table 3.

In order to obtain a further indication of how well the splices would perform in actual practice, coated abrasive joints as described above were tested on a splice testing machine which flexes the splice back and forth over a roller. The splices were found to compare favorably with conventional splices.

Although the essence of the present invention is the use of a woven fabric layer, a plastic film layer, means joining the woven fabric layer and the plastic film layer into an integral laminated patch, and means joining the integral laminated patch to the nonabrasive surface of the backing sheets, a variety of materials can be used for each of these components. For example, the woven fabric layer can be nylon, polyester, polybenzimidazole, cotton, and mixtures (such as blends) thereof. The word "nylon" is used in its presently understood sense, namely as meaning any manufactured fiber in which the fiber-forming substance is any long chain synthetic polyamide having recurring amide groups as an integral part of the polymer chain. It is specifically intended to include within the term "nylon" the aromatic nylons, i.e. manufactured fibers in which the fiber-forming substance is a long chain synthetic aromatic polyamide in which at least 85% of the amide linkages are attached directly to two aromatic rings, and in fact such nylons are highly preferred. A recent proposal to distinguish these two types of nylon is discussed in the Federal Register (published by the United States Government Printing Office) Volume 37, number 120, dated Wednesday, June 21, 1972 at page 12243. It is preferred that the woven fabric layer, prior to being joined to the plastic film layer into an integral laminated patch, be from about 100 to about 250 microns thick. Particularly preferred fabrics are aromatic polyamide nylon about 165 microns thick and about 230 microns thick, and polyester fabric about 125 microns thick. In any case, it is preferred that the woven fabric layer contain fabric which is cut in directions parallel to the running directions of the yarns which make up the fabric.

The plastic film should have appreciable strength to prevent the yawing of coated abrasive belts when straight slit fabric is used, should have heat resistence for operating conditions and manufacturing conditions, and should have multi-directional strength. Preferred plastic film layers are polyimide, polyester, polyethylene, and cellulose triacetate films, with the polyimide film being particularly preferred. The thickness of the plastic film layer, prior to being joined into an integral laminated patch, should be between about 25 and about 125 microns thickness with thickness of approximately 50 microns and 75 microns being particularly preferred.

One method of joining the woven fabric layer and the plastic film layer into an integral laminated patch prior to application to the endless belt is the fusing of the plastic film layer to the woven fabric layer. It is preferred, however, to use an adhesive, such as an adhesive from the group consisting of polyurethane adhesives, epoxy adhesives, nylon-epoxy adhesives, and nylon-phenolic adhesives. Polyurethane adhesives can be either thermosetting or thermoplastic. The thermosetting polyurethane adhesives can be reaction product of a triol such as a polyoxypropylene triol, and a diisocyanate, such as toluene diisocyanate; or from a diol and a triisocyanate. The thermosetting polyurethane adhesives are cured by the cross linking reaction which occurs between the trifunctional groups as the adhesives are cured.

Thermoplastic polyurethane adhesives can also be used. These can be reaction product of a diisocyanate such as toluene diisocyanate and a diol, such as polyoxypropylene diols. Due to the absence of a trifunctional group, there is no cross linking or thermosetting of the thermoplastic polyurethane adhesives. These adhesives instead are polymerized and become flowable upon the application of temperature, and become rigid when cooled.

Epoxy adhesives are thermosetting resin adhesives based on the reactivity of the epoxide group. One common type is the resin made from epichlorohydrin and bisphenol A, $(CH_3)_2C\ (C_6H_4OH)_2$. Nylon-epoxy adhesives and nylon-phenolic adhesives are described, and disclosed for use in coated abrasive belts, in U.S. Pat. Nos. 2,733,181; 3,154,897; 3,402,514; and 3,665,660.

The adhesive joining the woven fabric layer to the plastic film layer into an integral laminated patch should be between about 10 and about 25 microns thick.

The means joining the integral laminated patch to the nonabrasive surface of the backing sheet should be an adhesive again selected from the group consisting of polyurethane adhesives, epoxy adhesives, nylon-epoxy adhesives, and nylon-phenolic adhesives. It is preferred to join the fabric side of the integral laminated patch to the nonabrasive surface of the backing sheet, however, the plastic film side of the integral laminated patch can be joined to the nonabrasive side of the backing sheet, if desired. The adhesive means joining the integral laminated patch to the second surface of the backing sheet can vary between about 25 and 175 microns, with thicknesses between 50 and 125 microns being preferred.

The laminated patch firmly affixed to the second (non-abrasive) surface of the backing sheet can be as wide or narrow as desired, but widths between about 10 and 25 mm in width have been found to be preferred for most flexible abrasive-coated endless belts, and a width of about 17.5 mm has been found to be convenient. The endless belt itself can also be of any desired width, but the invention has greater applicability to belts having widths less than about 14 inches. If a belt has a width greater than 14 inches, the angle at which the belt is cut in order to make the joint can be relatively blunt, and if a fabric patch with straight slit fabric is used, the amount of yawing which occurs is relatively minimal.

I claim:

1. An endless belt of flexible sheet material having two complementary abuttingly juxtaposed ends forming a joint at an angle other than perpendicular to the running direction of the belt, wherein the improvement comprises: an integral laminated patch splice uniting said joint and comprising a straight slit woven fabric layer; a yaw preventing and heat resistant, plastic film layer having multi-directional strength; first means joining said woven fabric layer and plastic film layer into an integral laminated patch, and second means joining said patch to said sheet material, with said patch overlapping said ends and extending along said joint substantially at said angle.

2. The belt of claim 1 wherein said woven fabric layer is selected from the group consisting of nylon, polyester, polybenzimidazole, cotton and mixtures thereof.

3. The belt of claim 1 wherein said woven fabric layer is nylon.

4. The belt of claim 1 wherein said woven fabric layer is aromatic nylon.

5. The belt of claim 1 wherein said woven fabric layer is from about 100 to about 250 microns thick.

6. The belt of claim 1 wherein said plastic film layer is selected from the group consisting of polyimide, polyester, polyethylene, and cellulose triacetate.

7. The belt of claim 1 wherein said plastic film layer is polyester.

8. The belt of claim 1 wherein said plasic film layer is from about 25 to about 125 microns thick.

9. The belt of claim 1 wherein said first means is the fusing of said plastic film layer to said woven fabric layer.

10. The belt of claim 1 wherein said first means is an adhesive selected from the group consisting of polyurethane, epoxy, nylon-epoxy and nylon-phenolic adhesives.

11. The belt of claim 1 wherein said first means is polyurethane adhesive.

12. The belt of claim 1 wherein said first means is from about 10 to about 25 microns thick.

13. The belt of claim 1 wherein said second means is an adhesive selected from the group consisting of polyurethane, epoxy, nylon-epoxy and nylon-phenolic adhesives.

14. The belt of claim 1 wherein said second means is polyurethane adhesive.

15. The belt of claim 1 wherein said second means is from about 25 to about 175 microns thick.

16. The belt of claim 1 wherein said flexible sheet material is abrasive-coated and includes a flexible backing sheet having first and second surfaces, and abrasive grains firmly affixed to said first surface by a binder adhesive, said angle is from about 30° to about 70°, and said second means joins the fabric side of said patch to said second surface of said backing sheet.

17. The belt of claim 16 wherein said woven fabric layer is aromatic nylon.

18. The belt of claim 16 wherein said plastic film layer is polyester.

19. The belt of claim 16 wherein said first and second means are polyurethane adhesive.

20. The belt of claim 16 wherein said woven fabric layer is aromatic nylon and is from about 100 to about 250 microns thick, said plastic film layer is polyester and is from about 25 to about 125 microns thick, said first and second means are polyurethane adhesive and are from about 10 to about 25 microns and from about 25 to about 175 microns thick respectively.

* * * * *